United States Patent [19]
Loftin

[11] Patent Number: 4,971,628
[45] Date of Patent: Nov. 20, 1990

[54] SHOCK RESISTANT INK COMPOSITIONS AND WRITING INSTRUMENTS INCLUDING THE COMPOSITIONS

[75] Inventor: Rachel M. Loftin, Halifax, Mass.

[73] Assignee: The Gillette Company, Boston, Mass.

[21] Appl. No.: 347,681

[22] Filed: May 5, 1989

Related U.S. Application Data

[63] Continuation-in-part of Ser. No. 262,039, Oct. 24, 1988, abandoned, which is a continuation-in-part of Ser. No. 112,584, Oct. 26, 1987, abandoned, which is a continuation-in-part of Ser. No. 812,683, Dec. 13, 1985, abandoned.

[51] Int. Cl.$^5$ ................................................ B43K 7/08
[52] U.S. Cl. ...................................... 106/22; 106/20; 106/23
[58] Field of Search ............................ 106/20, 22, 23; 523/161; 401/141, 142

[56] References Cited

U.S. PATENT DOCUMENTS

| | | | |
|---|---|---|---|
| 3,526,522 | 9/1970 | Seregely et al. | 106/270 |
| 3,656,857 | 4/1972 | Seregely et al. | 106/270 |
| 4,671,691 | 6/1987 | Case et al. | 401/142 |

FOREIGN PATENT DOCUMENTS

| | | |
|---|---|---|
| 58-141256 | 8/1983 | Japan . |
| 2094820 | 3/1982 | United Kingdom . |
| 2131040 | 6/1984 | United Kingdom . |

Primary Examiner—Josephine Barr
Attorney, Agent, or Firm—John P. Morley

[57] ABSTRACT

Novel, improved aqueous-based, shear-thinning, shock-resistant ink compositions and writing instruments including the ink compositions. The ink compositions comprise a substantially uniform dispersion of colorant(s), a water-dispersible polymeric shear-thinning material, and a substantially water-soluble polymeric material in a polar solvent system.

9 Claims, No Drawings

SHOCK RESISTANT INK COMPOSITIONS AND WRITING INSTRUMENTS INCLUDING THE COMPOSITIONS

CROSS-REFERENCE TO RELATED APPLICATIONS

This application is a continuation-in-part of U.S. application Ser. No. 262,039, filed Oct. 24, 1988, now abandoned which is a continuation of U.S. application Ser. No. 112,584, filed Oct. 26, 1987, now abandoned which is a continuation-in-part of U.S. application Ser. No. 812,683, filed Dec. 13, 1985, now abandoned.

BACKGROUND OF THE INVENTION

1. The Field of the Invention

This invention relates to novel, improved ink compositions and to writing instruments including such ink compositions. More precisely, the invention disclosed herein relates to aqeuous ink compositions including water dispersible, polymeric shear-thinning providing materials and to writing instruments including the ink compositions.

2. Description of the Prior Art

Ink compositions including water dispersible, polymeric, shear-thinning providing materials are disclosed in commonly assigned, copending application Ser. No. 693,930 filed Jan. 23, 1985, by Laura K. Case et al (now U.S. Pat. No. 4,671,691). U.S. Pat. No. 4,671,691 is expressly incorporated herein in its entirety by reference. Essentially, the ink compositions disclosed in U.S. Pat. No. 4,671,691 are thickened liquids at rest. They are non-Newtonian liquids and may have a rheological yield value and exhibit shear-thinning flow behavior or shear-thinning flow characteristics in use. In other words, they become thin, readily flowable liquids having a viscosity of no greater than about 100 cPs (or m Pa.S) at shear rates produced in writing such as with a ball-point pen. The ink compositions include at least one water dispersible, polymeric shear-thinning providing material uniformly dispersed in a highly polar solvent system which is preferably water or primarily water. Other materials such as coloring materials, surfactants, preservatives, corrosion inhibitors, humectants and the like can also be included in the inks.

Shear-thinning inks have relatively high viscosities at low shear rates and are susceptible or vulnerable to the effects of shock. Normally, the shear-thinning inks disclosed in U.S. Pat. No. 4,671,691 are contained in hollow, non-pressurized tubes and fed directly to the nib or ball of the writing instrument. However, when the ink is contained in non-pressurized tubes, the instrument should be handled carefully to avoid excessive shock. For example, if the instrument is dropped, tapped against a hard object or otherwise jarred, the column of ink in the tube may separate or be pulled or pushed away from the region of contact between the column of ink and the ball. This separation can result in a pocket of air being established between the ball and the column of ink which can affect the writing performance of the instrument until contact between the ink column and the ball is restored. Additionally, the contact between the column of ink and the ball can be broken by being replaced by a gas bubble caused by evaporation or by entry of air around an uncapped ball during periods of non-use.

As those in the art know, a high viscosity ink can be retained in hollow, pressurized tubes in order to control the effects of shock. However, pressurized tubes can present unattractive manufacturing cost features in terms of materials and assembly particularly for low priced, disposable writing instruments. This invention is addressed to the problems of controlling the effects of shock on high viscosity ink compositions and provides an especially effective solution to those problems.

BRIEF SUMMARY OF THE INVENTION

The novel, improved ink compositions of the present invention are aqueous-based, shock-resistant, shear-thinning inks for writing instruments. The ink compositions exhibit non-Newtonian flow characteristics. They have a high viscosity at low shear rates and comprise a substantially uniform dispersion of colorant(s), a water dispersible, polymeric shear-thinning material, and a substantially water-soluble polymeric material in a polar solvent system. While the ink compositions have a high viscosity at low shear rates, they undergo shear-thinning and are readily flowable in response to shear rates produced in writing to provide a writing ink having an especially desirable combination of performance characteristics.

In the writing instruments of the invention, the ink compositions are contained in hollow, non-pressurized or low pressurized tubes or reservoirs, and the ink is fed directly to the writing ball of a ball-point pen. In the especially preferred writing instruments, the ink is used in combination with a viscoelastic follower composition having specific rheological properties which insure a smooth, continuous flow of ink to the ball as the ink supply is consumed.

DETAILED DESCRIPTION OF PREFERRED EMBODIMENTS

Essential ingredients of the ink compositions of the present invention are a water-dispersible, polymeric, shear-thinning material, a substantially water-soluble polymeric shock resistant providing material, colorants and a polar solvent system. The preferred polymeric shear-thinning materials are substantially water soluble.

Polymeric shear-thinning materials suitable in the practice of the invention are those which can be dispersed in a highly polar solvent system in combination with the shock resistant providing material to provide an ink having a shear-thinning index (n) of between about 0.5 to about 0.9 and most preferably between about 0.6 to about 0.8. For the purposes of this invention, the shear-thinning index (n) is calculated by fitting shear stress (T) and shear rate values (y) obtained from rheological measurements on a viscometer such as a HAAKE ROTOVISCO, Haake Inc., Saddle Brook, N.J. to the empirical power law equation $T = y^n$ (where K and n are calculated constants). Additionally, the shear-thinning index is obtained by measurements of an aqueous solution of the shear-thinning material at shear rates between about 30 to about 300 $sec^{-1}$. Shear stress values are measured from the curve on the HAAKE ROTOVISCO at different shear rates (typically 30, 90, 150, 210 and 300 $sec^{-1}$), and the measured shear stress values are fitted to the shear rates using a curve-fitting program.

Suitable polymeric shear-thinning materials provide inks which are thickened viscous liquids at rest or at low shear rates. For example, inks of the present invention have a viscosity of at least 50 cPs and usually about 100 cPs or higher at a shear rate of 30 $sec^{-1}$. However, in response to shear rates produced by writing, the inks undergo shear-thinning and have a viscosity of less than about 100 cPs at shear rates produced by writing. Accordingly, polymeric shear-thinning materials suitable in the practice of the invention are those which can provide a shock resistant ink having a shear-thinning index (n) between about 0.5 to about 0.9, a viscosity of 50 cPs or greater at a shear rate of 30 sec$^{-1}$ and a viscosity of about 100 cPs or less at shear rates produced by writing.

Preferred polymeric shear-thinning materials additionally provide aqueous ink compositions which do not undergo a significant change in viscosity in response to temperature. For the purposes of this invention, "a significant change in viscosity in response to temperature" is a change of greater than about 50 percent in the viscosity measurement of the ink composition (at the same shear rate) over at least one segment of a successive temperature range of about 10° C. which is within the temperature range of from about 0° C. to about 60° C. Especially preferred shear-thinning materials are those which do not undergo any significant change in viscosity over a 10° C. temperature range segment within the temperature range between about 5° C. to about 35° C. In other words, especially preferred polymeric shear-thinning materials are those which provide aqueous ink compositions having the described shear-thinning index and also provide ink compositions in which the change in viscosity measurement is not greater than about 50 percent between, for example, 0° C.–10° C. or 10° C.–20° C. or 20° C.–30° C. or 25° C.–35° C., etc.

Especially preferred specific shear-thinning materials are xanthan gum, carageenan gum, locust bean gum, hydroxyethylcellulose and guar gum. Xanthan gum is the particularly preferred shear-thinning material and preferred commercially available xanthan gums are sold by The Kelco Company under the trade names KELTROL and KELZAN.

The amount of polymeric shear-thinning material useful in the ink composition of the invention can vary. However, amounts of polymeric shear-thinning material between about 0.1 to about 5 or 6 percent by weight of the material based on the total weight of the composition are normally suitable. In the case of the preferred shear-thinning materials, amounts between about 0.5 to about 3 percent are normally suitable.

The selection of a particular substantially water-soluble, polymeric, shock resistant providing material and the amount thereof for use in the ink compositions of the invention is controlled by two primary considerations. First, the selected polymeric, shock resistant providing material and the amount used must be capable of providing improved shock resistance to the ink composition. Secondly, the selected polymeric material and the amount used must not adversely affect or otherwise impair the shear-thinning capability of the polymeric shear-thinning material of the ink composition. In other words, the ink composition will still provide a viscosity of no greater than about 100 cPs at shear rates produced by writing despite the addition of the shock resistant providing material.

Polymeric, shock resistant providing materials useful in the practice of the present invention include modified natural polymeric materials and synthetic polymeric materials. Modified natural polymeric materials include starch or cellulose molecules modified with various substituents to provide changes in water solubility or other physical properties. Synthetic polymeric materials include polyalcohols, polyacids, polyethers and polyamides derived from various synthetic monomers. Specific synthetic polymeric materials include polyvinyl alcohols, polyvinylpyrolidones, polyvinylmethyl ethers, polyolefinic acids and salts, polyacrylamides and ethylene oxide polymers. Synthetic polymeric materials are preferred since their effect—if any—on the viscosity and/or shear-thinning characteristics of the ink composition is minimal or controllable. The polymeric, shock resistant providing materials of the present invention remain substantially water soluble after the ink is dry.

The exact mechanism by which the polymeric material provides improved shock resistance is now known. However, it is believed that the polymeric material alone or together with other components of the ink composition forms a coherent or semi-coherent film or mass which seals or provides a protective barrier about the space between the outside dimensions of the ball and the inside dimensions of the pen surrounding the ball. The seal is believed to be sufficiently strong so that it is not broken even when subjected to severe shock. However, the seal is readily broken in response to shear rates generated on writing so that a smooth and continuous supply of ink is resumed even after long-term storage (180 days) of the writing instrument without a cap.

Preferred polymeric, shock resistant providing materials are the substantially water-soluble film-forming polymeric materials such as polymers of vinylpyrrolidone and vinyl alcohol. Other polymeric, shock resistant providing materials include polymers of maleic acid or maleic anhydride or polymers including olefin acid radicals such as substituted or unsubstituted aryl or arylyl radicals. Polyvinylpyrrolidone is the especially preferred polymeric material. The amount of polymeric material used in the ink compositions of the invention can vary and depends to a certain extent on the molecular weight of the polymeric material with the amounts of higher molecular weight materials being less than lower molecular weight materials. Amounts of polymeric material between about 0.1 to about 20 percent by weight of the ink composition are normally suitable. The preferred amounts of the preferred polyvinylpyrrolidone are between about 0.1 to about 5 percent by weight and the ratio of the amount of polyvinylpyrrolidone to the amount of polymeric shear-thinning providing materials can range between about 10:1 to about 1:10 and preferably between about 5:1 to about 1:5. Preferred ink compositions of the invention include from about 0.5 to about 3 percent by weight polyvinylpyrrolidone and from about 0.5 to about 3 percent by weight xanthan gum. Especially preferred ink compositions of the present invention include from about 1.25 to about 2.5 percent by weight polyvinylpyrrolidone and from about 1.25 to about 1.5 percent by weight xanthan gum.

Ink compositions of this invention are aqueous-based, shear-thinning inks and include a polar solvent system in which water is the primary solvent for the polymeric shear-thinning material and the water-soluble, polymeric shock resistant providing material. The polar solvent system may comprise from about 50 to about 99 percent by weight of the ink composition. While water is the primary or essential solvent of the solvent system, other polar solvents can be included in the solvent system in place of up to about 50 percent (or somewhat higher) by weight of the water in the solvent system. Preferred ink compositions of this invention are those having 80 percent (or greater) by weight of water in the polar solvent system. As will be demonstrated in the Examples which follow, ink compositions of this invention can comprise polar solvent systems having 100 percent by weight water or substantially 100 percent by weight water. In short, water is the primary solvent of the polar solvent systems of inks of the present invention, and the use of any other particular polar solvent and the amount thereof used in combination with water is not an especially critical feature in ink compositions of this invention.

Other polar solvents which may be included in polar solvent systems of ink compositions of the invention are those which can function as hydroscopic wetting agents useful in reducing the ink drying rates and include dihydric alcohols such as ethylene glycol, diethylene glycol, triethylene glycol, 1,3-propanediol, propylene glycol, 1.3-butylene glycol, 1,4-butanediol, 2,3-butylene glycol, neopentyl glycol, hexylene glycol, thiodiglycol, and the like. Other polar-solvent wetting agents include tri- and higher-hydric alcohols such as glycerin, trimethylolethane, trimethylolpropane, 3-methyl pentane-2,3,5-triol, diglycerin, sorbitol, pyrrolidone, N-methyl-2-pyrrolidone, dimethylformamide, urea, and the like. Preferred amounts of other polar solvents which may be included in the polar solvent system are between about 5 to about 20 percent by weight of the total weight of the polar solvent system.

Ink compositions of this invention advantageously include an organic solvent material capable of penetrating into the paper-writing surface to act as a drying agent and also to act as a levelling agent for the ink to produce a smooth writing result. Examples of such materials include glycol ethers such as alkylene glycol mono- and di-alkyl ethers, glycol ether acetates such as alkylene glycol mono- and di-alkyl ethers and glycol acetates such as alkylene glycol mono- and di-acetates. The especially preferred drying and levelling function complex includes fluorinated polysilane surface active agents such as the product sold under the trademark LEVELENE 100 (American Color & Chemical Corp.). These materials can be used in amounts of from about 0.01 to about 2.0 percent by weight, preferably 0.1 to 1.0 percent.

The colorant material employed in the inks of this invention may be any of the water-soluble or water-dispersible dyes or pigments or mixtures thereof known to be useful in the formulation of inks for writing instruments and may comprise up to about 30 percent by weight of the inks. Water-soluble dyes are the especially preferred colorant materials. Examples of dyes or pigments which can be used include, but are not limited to, DIRECT VIOLET 99, DIRECT BLUE 86 (C.I. 74180), (both manufactured by the Mobay Chemical Co.); ELFTEX 5, MOGUL L. and REGAL 330R, all carbon blacks (The Cabot Corporation) HIDRACOL X9220 and X9200 (Ciba-Geigy); and FAST LIGHT ORANGE 2GM (American Cyanamid).

Ink compositions of the present invention can include sequestering agents to maintain or improve stability. These sequesterants are normally added in amounts from 1–50 percent by weight of the shear-thinning providing materials. Examples of useful sequestering agents include sodium hexametaphosphate, trisodium phosphate, and sodium glucoheptanate, and tetrasodium EDTA.

Ink compositions of the present invention can also include preservatives to prevent the growth of microorganisms, yeast, and mold. Examples of such preservatives include methyl p-hydroxybenzoate, propyl p-hydroxybenzoate, DOWICIL 75 and 200 (active ingredient: 1-(3-chloroallyl)-3,5,7-triaza-1-azoniaadamantane chloride (Dow Chemical Co.). These biocides are typically present at from 0.01–5 percent by weight of the ink.

When aqueous ink compositions of the invention are likely to come in contact with metals, corrosion inhibitors such as benzotriazole are often used. Such materials may constitute up to about 5 percent by weight of the ink but are preferably used in amounts less than about 0.5 percent.

The preferred colorant materials in ink compositions of the invention are water-soluble colorant materials. However, colorant materials which are substantially water insoluble when the ink composition is dry may also be used. When such water-insoluble colorant materials are used, the ink composition may additionally include water-dispersible or water-soluble polymeric materials which are substantially water insoluble when the ink composition is dry. Polymeric materials which are substantially water insoluble when the ink composition is dry can bind, hold or retain colorant materials which are also substantially water insoluble to provide a coalesced residue of polymeric material and colorant material which is water-fast. Accordingly, the use of such polymeric and colorant materials in combination with the polymeric, shear-thinning providing materials of this invention can provide shear-thinning, shock-resistant ink compositions having a degree of water-fastness.

The ink compositions of this invention are easily prepared by combining the desired ingredients in a blender or mixing with a propeller stirrer until homogeneity is achieved. Preferably the polymeric shear-thinning providing material or materials is first added to distilled water and this combination mixed for about two hours. The other ingredients, if present, are added in the following order: other polar solvents, sequestering agents, preservatives, surfactants, corrosion inhibitors, and dyes and/or pigments. In some cases, it is advisable to pre-wet the shear-thinning providing material with a humectant such as propylene glycol or glycerol. Generally, the amount of such humectant is 1 to 5 times by weight of the amount of shear-thinning providing material added. Preferably, the polymeric, shock resistant providing material is added to the ink composition as the last ingredient and mixed or blended with the composition in a blender.

Typical preferred ink compositions in the practice of the invention are contained in illustrative Examples I–II below.

EXAMPLE I

| Material | Weight % |
| --- | --- |
| Xanthan Gum | 1.25 |
| Polyvinylpyrrolidone[1.] | 2.50 |
| EDTA (tetrasodium) | 0.30 |
| Fluorinated polysilane surface active agent (LEVELENE 100, American Color and Chemical Co.) | |
| Benzotriazole | 0.30 |
| Methyl p-hydroxybenzoate | 0.15 |
| Dye (Direct Violet 99) | 10.00 (Solids) |
| Water | 85.00 |

The shear-thinning index of the ink was 0.65. 1. The polyvinylpyrrolidone used was a commercially available polyvinylpyrrolidone having an average molecular weight of about 360,000 and sold by GAF Inc. under the designation PVP K-90.

EXAMPLE II

| Material | Weight % |
| --- | --- |
| Xanthan Gum | 1.00 |
| Polyvinyl alcohol[2.] | 5.00 |
| EDTA (tetrasodium) | 0.30 |
| Flourinated polysilane surface active agent (LEVELENE 100, American Color and Chemical Co.) | 0.50 |
| Benzotriazole | 0.30 |
| Methyl p-hydroxybenzoate | 0.15 |
| Dye (Direct Violet 99) | 10.00 (Solids) |
| Water | 87.25 |

The shear-thinning index of the ink was 0.85. 2. The polyvinyl alcohol used was a commercially available polyvinyl alcohol sold by E.I. duPont de Nemours under the tradename ELVANOL 71-30.

EXAMPLE III

In order to demonstrate the improved shock resistance of the aqueous-based shear-thinning inks of the present invention, a direct comparison of the shock resistance of the inks of Examples I, II, and a Control shear-thinning ink are presented below. The composition of the Control shear-thinning ink was as follows:

| Material | Weight % |
| --- | --- |
| Xanthan Gum | 1.25 |
| EDTA (tetrasodium) | 0.30 |
| Fluorinated polysilane surface active agent (LEVELENE 100, American Color and Chemical Co.) | 0.50 |
| Benzotriazole | 0.30 |
| Methyl p-hydroxybenzoate | 0.15 |
| Dye (Direct Violet 99) | 10.00 (Solids) |
| Water | 87.50 |

Each ink was included in the unpressurized reservoir or identical ball-point pens (1.5 mls. ink in each reservoir) and the shock-resistant properties of each ink were determined in accordance with the following Tapping Test Procedure.

TAPPING TEST PROCEDURE

1. Handwrite 10 Johnson's.
2. Drop pen, point up, 10 times from a height of 1".
3. Immediately handwrite 10 Johnson's.
4. Store pen, point up, for 1 hour.
5. After 1 hour, handwrite 10 Johnson's.
6. Repeat 1–5 for 10 pens of each group.
7. Report % of 100 Johnson's from #3 which are acceptable (Score #3).
8. Report % of 100 Johnson's from #5 which are acceptable (Score #5).

The above Tapping Test Procedure involved apparatus designed to retain the pen in a vertical position and repeatedly drop or tap the retained pen from a controlled height of one inch ten times so that the shock force sustained in each drop is substantially constant for each pen tested.

Table A below summarizes the shock-resistant properties of the tested inks.

TABLE A

| Score | Example I | Example II | Control |
| --- | --- | --- | --- |
| #3 | 100 percent | 100 percent | 56 percent |
| #5 | 100 percent | 100 percent | 90 percent |

Score #3 and Score #5 of Table A represent the percentage derived from an examination of 100 writings of the word "Johnson" with each of the inks tested. The word "Johnson" has been selected since it is considered to be the best written word to evaluate the propensity of an ink which has been subjected to shock to skip or display starving which are characteristics evidencing the effects of shock. In the examination of the 100 writings, a score of 1 percentage point is given to each "Johnson" which has no observable skip or starved areas. No percentage point is given to a "Johnson" providing a skip or starved area. Score #3 generally reflects the immediate effect of back shock on an ink while Score #5 reflects longer term effects of shock. As can be seen from Table A, the writings of the inks of the present invention did not present skip or starved areas after the inks had been subjected to shock. However, the writings of the Control ink did evidence the effects of shock especially in Score #3. Additionally, some pens containing the Control ink in non-pressurized tubes evidenced the effects of shock when the pens were shipped. However, no such effects were encountered with pens containing the inks of the present invention in non-pressurized tubes which were shipped or handled or tapped repeatedly on the back end portion of the pen against a hard surface.

The reservoirs of the pens tested in Example IV included a viscoelastic follower composition which comprised mineral oil, polybutene and clay (BENTONE 34). The preferred viscoelastic follower compositions for use in combination with the shock-resistant shear-thinning inks of the present invention are described in detail in U.S. Pat. No. 4,617,691 already incorporated by reference. Essentially the preferred viscoelastic follower compositions comprise from about 5 to about 99 percent by weight of the composition of mineral oil, from about 5 to about 99 percent by weight polybutene and from about 0.1 to about 10 percent by weight of an organophilic clay. The relative proportions of the above ingredients are selected so that the resultant follower composition exhibits increasing tan delta values over the shear rate range of 5 to 30,000 sec$^{-1}$ and also exhibit tan delta values of less than about 1 at shear rates up to 50 sec$^{-1}$.

Writing or marking instruments of the present invention include structural elements common to conventional and commercially available ball-point writing instruments. Essentially, these elements include a body retaining an ink reservoir, means for delivery of the ink to a socket located at one end of the instrument and a rotatable point retained in the socket and adapted to apply ink delivered to the socket to a surface to provide visible markings on the surface. The especially preferred instruments or pens include a viscoelastic follower of the type described above in the reservoir.

From the above description it is apparent that the novel improved shear-thinning inks of the present invention provide significant and unexpected advantages. They have high viscosities at low shear rates and accordingly do not present leakage problems in writing instruments such as roller ball writing instruments. However, when subjected to shear rates such as are produced in writing, the inks undergo shear thinning and are readily flowable to provide writing of excellent quality and performance characteristics. Additionally the shear-thinning inks are substantially shock-resistant and therefore provide an effective solution to a problem long outstanding in the art. Accordingly, the invention presents to the art shock-resistant, shear-thinning inks which present an idealized combination of desired performance characteristics and which are unexpectedly different from shear-thinning inks known to the art at the time this invention was made.

I claim:

1. A shock-resistant, shear-thinning ink composition consisting essentially of:
   (a) from about 50 to about 99 percent by weight of a polar solvent system including at least about 50 percent by weight water,
   (b) colorant material in an amount up to about 30 percent by weight,
   (c) an amount of a water-dispersible, polymeric shear-thinning material sufficient to provide an ink having a shear-thinning index between about 0.5 to about 0.9, a viscosity of 50 cPs or greater at a shear rate of 30 sec$^{-1}$ and a viscosity of 100 cPs or less at shear rates produced by writing, and
   (d) an amount of a water-soluble, film-forming, polymeric, shock-resistant providing material effective to provide shock-resistance for the ink composition but ineffective to substantially affect the shear-thinning capability of the polymeric shear-thinning material.

2. A composition of claim 1 where the viscosity at a shear rate of 30 sec$^{-1}$ is 100 cPs or greater.

3. A composition of claim 1 where the ink has a shear-thinning index between about 0.6 to about 0.8.

4. A composition of claim 1 where the shear-thinning material is selected from the group consisting of xathan gum, carageenan gum, locust bean gum, hydroxyethylcellulose, guar gum, and mixtures of these.

5. A composition of claim 1 where the shock resistant providing material is selected from the group consisting of a vinyl pyrrolidone polymer, a vinyl alcohol polymer or mixtures of these.

6. A composition of claim 1 where the shock resistant providing material is a vinylpyrrolidone polymer.

7. A composition of claim 6 where the shock resistant providing material is a polyvinylpyrrolidone polymer.

8. A composition of claim 7 where the ink composition includes from about 0.5 to about 3.0 percent by weight xanthan gum and from about 0.5 to about 3 percent by weight polyvinylpyrrolidone, and the ratio of polyvinylpyrrolidone to xanthan gum is between about 10:1 to about 1:10.

9. A composition of claim 1 where the solvent system comprises a mixture of water and at least one other polar solvent.

* * * * *